(12) United States Patent
Jackson (10) Patent No.: US 10,313,493 B2
(45) Date of Patent: Jun. 4, 2019

(54) METHODS, SYSTEMS AND COMPUTER READABLE MEDIA FOR NETWORK TAPPING AND PACKET BROKERING IN WIRELESS NETWORKS

(71) Applicant: Ixia, Calabasas, CA (US)

(72) Inventor: Stephen Samuel Jackson, Chapel Hill, NC (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 153 days.

(21) Appl. No.: 15/383,299

(22) Filed: Dec. 19, 2016

(65) Prior Publication Data

US 2018/0176342 A1    Jun. 21, 2018

(51) Int. Cl.
| | | |
|---|---|---|
| H04L 12/46 | (2006.01) |
| H04L 29/06 | (2006.01) |
| H04W 84/12 | (2009.01) |
| H04W 4/80 | (2018.01) |

(52) U.S. Cl.
CPC .............. H04L 69/22 (2013.01); H04L 69/08 (2013.01); H04L 12/4633 (2013.01); H04W 4/80 (2018.02); H04W 84/12 (2013.01)

(58) Field of Classification Search
None
See application file for complete search history.

(56) References Cited

U.S. PATENT DOCUMENTS

| | | |
|---|---|---|
| 7,047,042 B2 | 5/2006 | Komara et al. |
| 7,333,964 B2 | 2/2008 | Dippon |
| 7,539,489 B1 | 5/2009 | Alexander |
| 7,672,669 B2 | 3/2010 | Alexander et al. |
| 7,890,821 B2 | 2/2011 | Music et al. |
| 8,098,677 B1 | 1/2012 | Pleshek et al. |
| 8,600,311 B2 | 12/2013 | Gregg et al. |
| 9,369,369 B2 | 6/2016 | Stott et al. |
| 2003/0108044 A1 | 6/2003 | Hendel |

(Continued)

FOREIGN PATENT DOCUMENTS

WO    WO-2013/089874 A1    6/2013

OTHER PUBLICATIONS

Notice of Allowance and Fee(s) Due for U.S. Appl. No. 13/785,878 (dated Feb. 11, 2016).

(Continued)

*Primary Examiner* — Brandon M Renner (57) ABSTRACT

A method for network tapping and packet brokering in wireless networks includes tapping a signal in a wireless network and determining whether the signal is a valid signal according to a wireless network protocol. In response to determining that the signal is a valid signal according to the wireless network protocol, the signal is demodulated into a sequence of bits arranged according to the wireless network protocol. In response to determining that the signal is not a valid signal according to the wireless network protocol, an indication that the signal is not a valid signal according to the wireless network protocol is generated. A packet in a format compatible with a network tapping and packet brokering system is generated. At least some of the bits or the indication is inserted in the packet. The packet is transmitted to the network tapping and packet brokering system.

19 Claims, 5 Drawing Sheets

(56) References Cited

U.S. PATENT DOCUMENTS

| | | | |
|---|---|---|---|
| 2006/0262763 A1 | 11/2006 | Peleg et al. | |
| 2008/0298380 A1 | 12/2008 | Rittmeyer et al. | |
| 2009/0094492 A1 | 4/2009 | Music et al. | |
| 2011/0103235 A1 | 5/2011 | Luong et al. | |
| 2012/0051224 A1 | 3/2012 | Olgaard et al. | |
| 2012/0243638 A1* | 9/2012 | Maltsev | H04W 72/0453 375/316 |
| 2013/0049786 A1 | 2/2013 | El-Hassan et al. | |
| 2013/0326274 A1 | 12/2013 | Olgaard et al. | |
| 2014/0133321 A1 | 5/2014 | Luong et al. | |
| 2014/0254647 A1 | 9/2014 | Stott et al. | |
| 2014/0334288 A1* | 11/2014 | Hong | H04L 12/6418 370/216 |
| 2016/0241382 A1* | 8/2016 | Kang | H04L 7/0037 |
| 2016/0241452 A1* | 8/2016 | Ringland | H04L 41/082 |
| 2017/0005886 A1* | 1/2017 | Dade | H04L 43/065 |
| 2017/0347340 A1* | 11/2017 | Haley | H04L 25/0204 |
| 2018/0049027 A1* | 2/2018 | Abraham | G06F 11/1004 |

OTHER PUBLICATIONS

Applicant-Initiated Interview Summary for U.S. Appl. No. 13/785,878 (dated Jan. 22, 2016)
Non-Final Office Action for U.S. Appl. No. 13/785,878 (dated Aug. 27, 2015).
Advisory Action for U.S. Appl. No. 13/785,878 (dated Jul. 9, 2015).
Final Office Action for U.S. Appl. No. 13/785,878 (dated Mar. 30, 2015).
Applicant Initiated Interview Summary for U.S. Appl. No. 13/785,878 (dated Dec. 12, 2014).
Non-Final Office Action for U.S. Appl. No. 13/785,878 (dated Sep. 2, 2014).
"PCI Express® Protocol Triggering and Decode for Infiniium 9000 Series Oscilloscopes," Data Sheet, Agilent Technologies, pp. 1-8 (Jun. 2014).
"WLAN 802.11a/b/g/n/ac X-Series Measurement Application N9077A & W9077A," Technical Overview, Agilent Technologies, pp. 1-19 (Jun. 2014).
"WaveTest Multi-client Traffic Generator/Performance Analyzer," Ixia Data Sheet, Document No. 915-6019-01 Rev D, pp. 1-9 (Apr. 2014).
"WaveBlade Wi-Fi 802.11 a/b/g/n," Ixia Data Sheet, Document No. 915-6016-01 Rev C, pp. 1-6 (Jan. 2014).
"Testing WLAN Devices According to IEEE 802.11 Standards," Application Note, Agilent Technologies, pp. 1-15 (Oct. 2013).
"Creating and Optimizing 802.11ac Signals and Measurements," Application Note, Agilent Technologies, pp. 1-24 (Jul. 2012).
Bardwell, Joseph, "Wireless Network Site Verification and Analysis Tools," Connect802 Corporation, pp. 1-18 (2008).
Dreimann, Michael, "LTE protocol tests for IO(D)T and R&D using the R&S®CMW 500," Wireless Technologies Testers, pp. 16-20 (Publication Date Unknown).
"WLAN Monitoring Made Easy," CommView® for WiFi, Wireless Network Monitor and Analyzer, TAMOSOFT, pp. 1-3 (Publication Date Unknown).
Burke, Ronald, "Using Protocol Aware Tools to Simplify Program Development for RF SOC Test," High Frequency Electronics, vol. 10, No. 12, pp. 32, 34, & 36 (Dec. 2011).

* cited by examiner

METHODS, SYSTEMS AND COMPUTER READABLE MEDIA FOR NETWORK TAPPING AND PACKET BROKERING IN WIRELESS NETWORKS

TECHNICAL FIELD

The subject matter described herein relates to network tapping and packet brokering. More particularly, the subject matter described herein relates to methods, systems, and computer readable media for network tapping and packet brokering in wireless networks.

BACKGROUND

Network visibility systems, such as network tapping and packet brokering systems, provide network visibility in wired networks. For example, optical and electrical network tap devices are placed in line between other wired network devices and copy packets traveling between the devices. The packet copies are provided to network tool optimizers, which broker the packets to one or more network visibility tools or applications. In another example, a network switch may include a tap port that provides copies of packets traversing the switch to network visibility tools or applications.

Wireless local area network protocols, such as the 802.11ad protocol, provide short range wireless connectivity between processing and storage devices. Such short range connectivity allows the creation of ad hoc networks to allow clustering of connected devices to achieve processing and/or storage goals. However, because network visibility products are designed for wired networks, network visibility in networks between devices connected by short range wireless local area network protocols is lacking.

Wireless network monitoring devices exist to monitor packets in wireless local area networks. However, such devices may only be capable of monitoring packets according to the protocol or protocols for which they are designed, which are different from those used by the network tapping and packet brokering system. For example, an 802.11 monitoring device may be capable of demodulating 802.11 signals into 802.11 bitstreams. Network tapping and packet brokering systems expect wired network protocol packet formats, such as 802.3 Ethernet packet formats. Because network tapping and packet brokering systems are not compatible with wireless network protocol formats, network visibility has not been fully extended into such networks.

Accordingly, there exists a need for network tapping and packet brokering in wireless networks.

SUMMARY

A method for network tapping and packet brokering in wireless networks includes tapping a signal in a wireless network. The method further includes determining whether the signal is a valid signal according to a wireless network protocol. The method further includes, in response to determining that the signal is a valid signal according to the wireless network protocol, demodulating the signal into a sequence of bits arranged according to the wireless network protocol. The method further includes, in response to determining that the signal is not a valid signal according to the wireless network protocol, generating an indication that the signal is not a valid signal according to the wireless network protocol. The method further includes generating a packet in a format compatible with a network tapping and packet brokering system. The method further includes inserting, in the packet, at least some of the bits or the indication. The method further includes transmitting the packet to the network tapping and packet brokering system.

A system for network tapping and packet brokering in wireless networks includes a wireless network tap for tapping a signal in a wireless network. The wireless network tap includes a valid signal determining module for determining whether the signal is a valid signal according to a wireless network protocol. The wireless network tap further includes a demodulator for, responsive to a determination that the signal is a valid signal according to the wireless network protocol demodulating the signal into a sequence of bits arranged according to the wireless network protocol. The system further includes a network tapping and packet brokering interface for, in response to a determination that the signal is not a valid signal according to the wireless network protocol, generating an indication that the signal is not a valid signal according to the wireless network protocol. The network tapping and packet brokering interface module generates a packet in a format compatible with a network tapping and packet brokering system, inserts, in the packet, at least some of the bits or the indication, and transmits the packet to the network tapping and packet brokering system The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
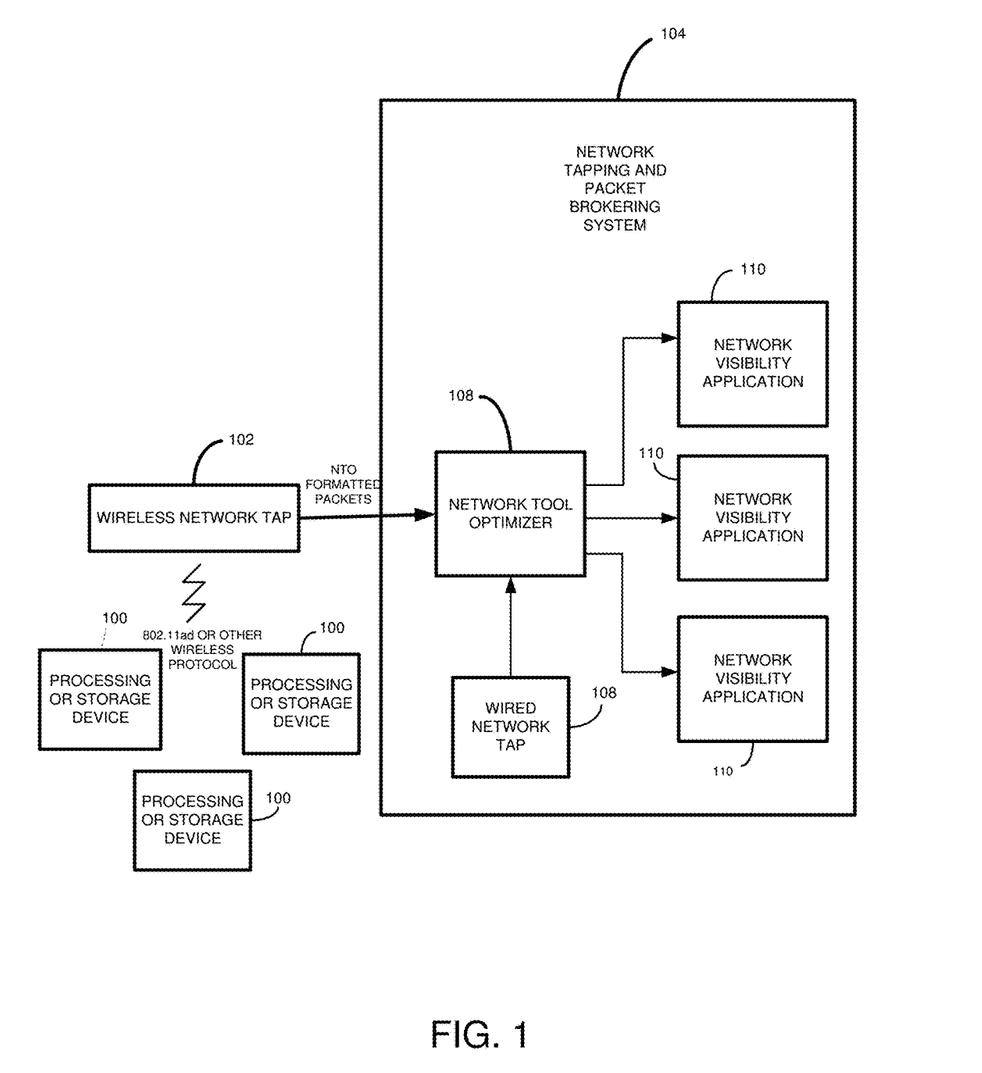
FIG. 1 is a block diagram of system for network tapping and packet brokering in wireless networks.

FIG. 1 is a diagram illustrating an exemplary system for wireless network tapping and packet brokering according to an embodiment of the subject matter described herein. Referring to FIG. 1, one or more processing and or storage devices 100 may be wirelessly connected to each other and communicate via a wireless local area network protocol, such as 802.11ad. A wireless network tap 102 may tap signals transmitted between devices 100 on the wireless local area network and may make an initial determination as to whether a received signal is a valid signal according to the protocol being monitored. For example, if wireless network tap 102 monitors 802.11ad communications, wireless network tap 102 may perform decorrelation processing according to the 802.11ad standard to extract potential single user signals from multi-user signals. Wireless network tap 102 may then compare the potential single user signals to noise signatures or valid signal signatures to determine whether the signals are potentially valid according to the 802.11ad protocol. If wireless network tap 102 identifies a signal as invalid according to the protocol being monitored, e.g., because the signal matches a noise signature or fails to match a valid signal signature, then wireless network tap 102 may communicate an indication that the signal is invalid to a network tap and packet brokering system 104. Network tapping and packet brokering system 104 may include one or more network taps 106 that tap wired electrical and optical signals, and a network tool optimizer 108 that brokers monitored packets to one or more network visibility applications 110.

If wireless network tap 102 determines that a signal is potentially valid according to the protocol being monitored, wireless network tap 102 may demodulate the signal to produce a packet formatted according to the protocol being monitored. Continuing with the 802.11ad example, wireless network tap 102 may demodulate the signal into an 802.11ad packet or frame. Wireless network tap 102 may then convert the packet from the wireless local area network protocol to a protocol compatible with the network visibility system. In one example, wireless network tap 102 may encapsulate the entire 802.11ad frame in an 802.3 Ethernet frame. In another example, wireless network tap 102 may replace one or more layers of the 802.11ad frame with layers of the protocol used by the network tapping and packet brokering system. For example, wireless network tap 102 may replace layers 1 and 2 of the 802.11ad protocol with layers 1 and 2 of the protocol used by network tapping and packet brokering system 104.

One potential advantage of using wireless network tap 102 over conventional wired network tap deployments is that wireless network tap 102 can simultaneously monitor and tap packets between multiple devices without requiring connections to wired physical interfaces of the devices. In wired network tap deployments, a wired network tap is physically connected by cables to network interfaces on which packets are tapped. If a new device is added to a network, a wired network tap may not necessarily be capable of tapping packets from the newly added device unless those packets traverse the currently tapped network interfaces. In contrast, in the example illustrated in FIG. 1 where wireless network tap 102 is placed within the communication range specified by the wireless network protocol of device 100, wireless network tap 102 can monitor all traffic between all devices. When a new device 100 is added to the network, wireless network tap 102 can automatically tap traffic to and from the newly added device without requiring the addition of wired connections to the newly added device.

Figure 2:
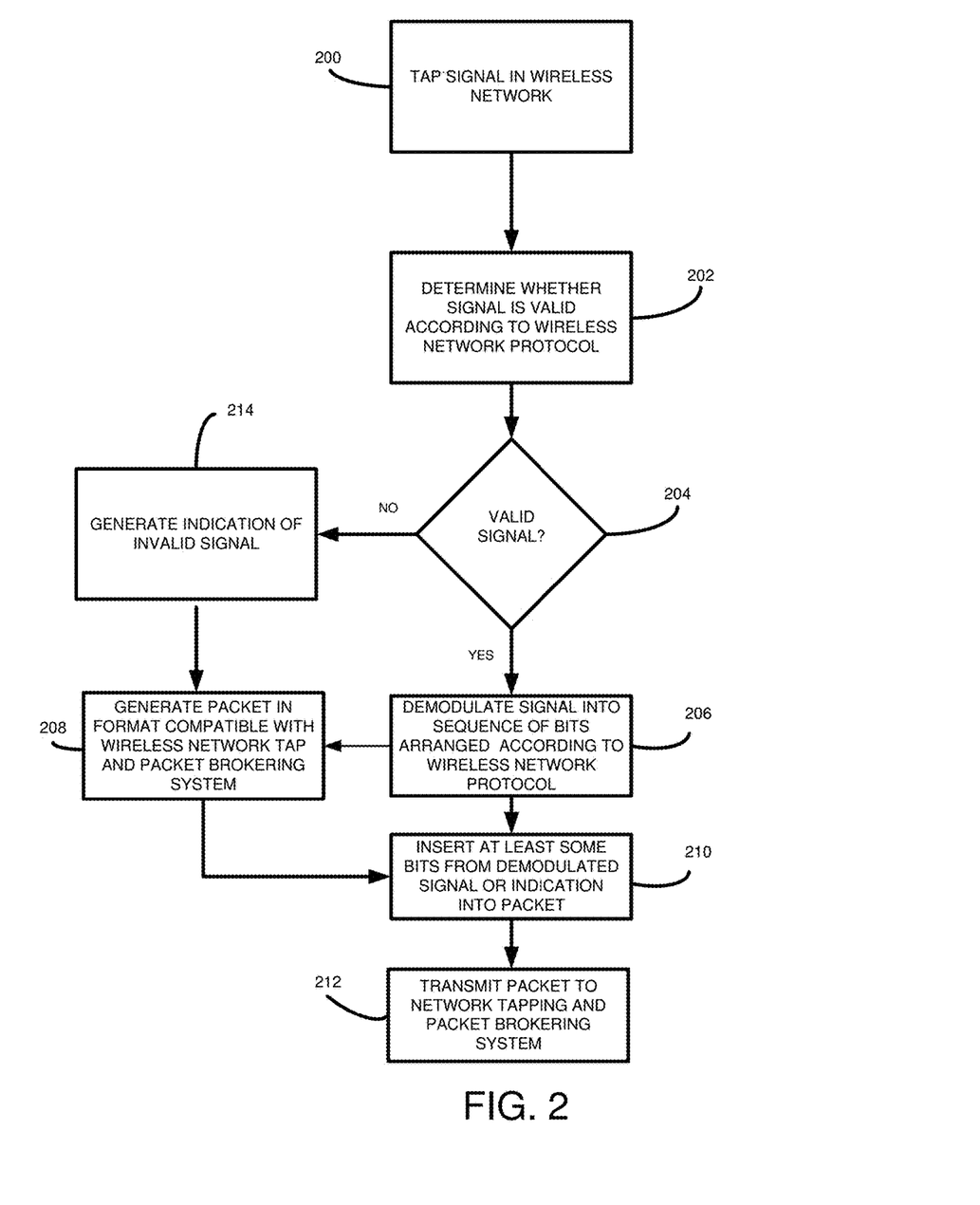
FIG. 2 is a flow chart of an exemplary process for network tapping and packet brokering in wireless networks.

FIG. 2 is a flow chart illustrating an exemplary process for network tapping and packet brokering in a wireless network according to an embodiment of the subject matter described herein. Referring to FIG. 2, in step 200, the process includes tapping a signal in a wireless network. For example, wireless network tap 102 may include a radio interface compatible with the protocol used in the wireless network and capable of intercepting a signal transmitted between processing or storage devices 100 in the wireless network. In one example, the network may be an 802.11ad network, and the signal may be valid 802.11ad signal or an invalid signal, such as a noise signal intentionally transmitted to disrupt wireless communications in the 802.11ad network. If the protocol uses is 802.11ad, wireless network tap 102 may include a radio interface configured to monitor a frequency band centered around 60 GHz, which is the frequency band used by 802.11ad compatible devices.

In step 202, the process includes determining whether the signal is a valid signal according to a wireless network protocol. Determining whether the signal is a valid signal may include performing decorrelation processing on the signal to extract a single user signal from multi-user signal and comparing the extracted signal to known attack or valid signal signatures. If the signal does not match an attack signal signature or matches a valid signal signature, then control proceeds to step 206, where the signal is demodulated according to the wireless local area network protocol to produce a sequence of bits arranged according to the wireless local area network protocol. Continuing with the 802.11ad example, demodulating the signal may include demodulating the signal using spread spectrum demodulation, single carrier demodulation, or orthogonal frequency division multiplexing (OFDM) demodulation, as specified by the 802.11ad protocol to produce a packet or frame formatted according to the 802.11ad protocol.

Because network tapping and packet brokering system 104 may not be configured to receive wireless local area network packets formatted according to the wireless local area network protocol, in step 208, the process includes generating a packet in format compatible with a network tapping and packet brokering system. Control then proceeds to step 210 where at least some of the bits from the demodulated wireless local area network signal are inserted into the generated frame or packet compatible with network tapping and packet brokering system 104.

Figure 3:
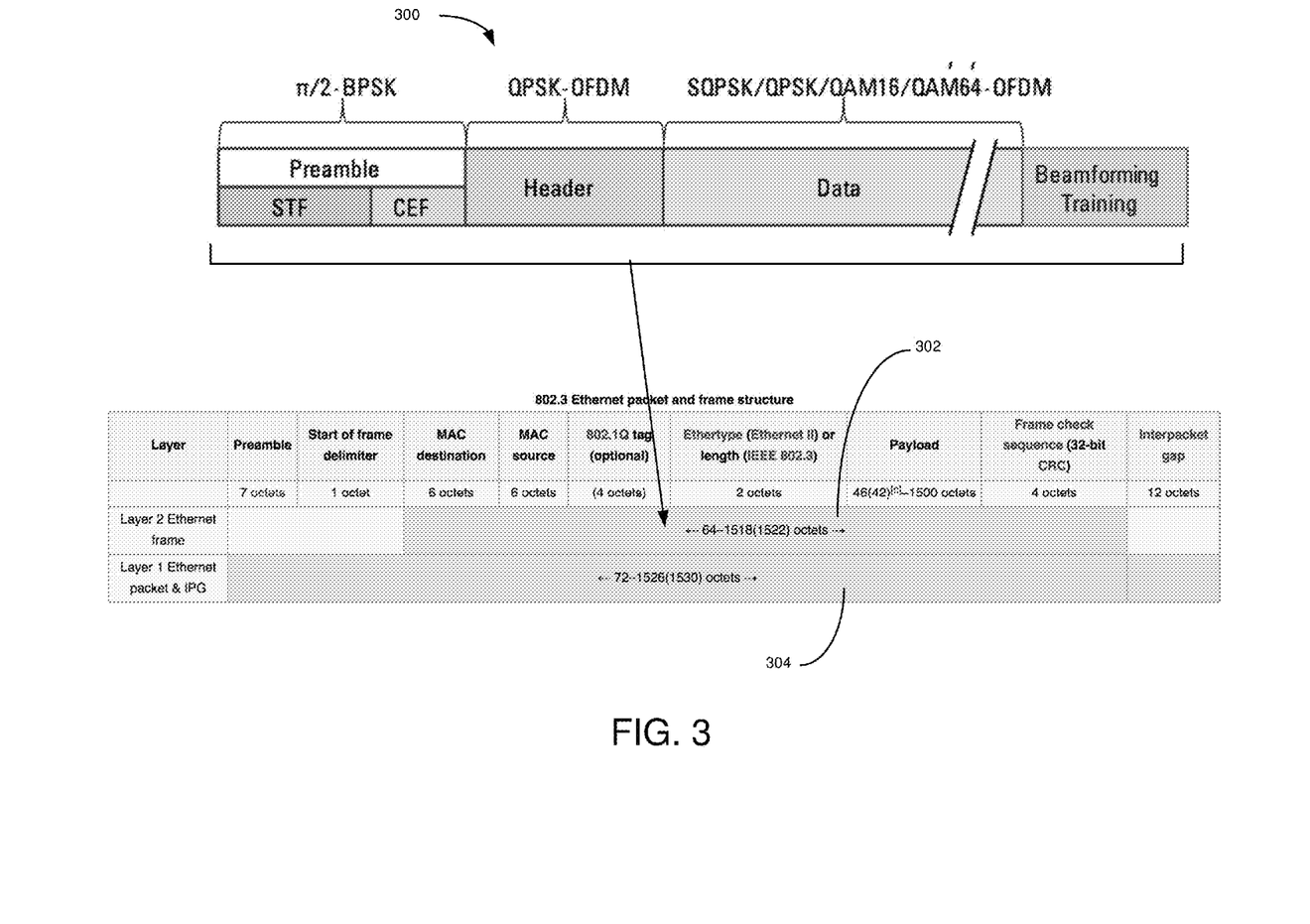
FIG. 3 is a diagram illustrating a method for encapsulating an 802.11ad frame in an 802.3 Ethernet frame.

In one example, the protocol used by the wireless local area network may be 802.11ad, and the protocol used by the network tapping and packet brokering system may be wired Ethernet (e.g., 802.3 Ethernet). FIG. 3 illustrates one example of an 802.11ad frame 300 that may be tapped from the wireless local area network by wireless network tap 102. Referring to FIG. 3, an exemplary 802.11ad frame 300 is shown. The 802.11ad standard specifies three different modulation formats: OFDM, spread spectrum modulation, and single carrier modulation. The OFDM frame format is shown in FIG. 3 for illustrative purposes. A wireless network tap 102 according to the subject matter described herein may be configured to capture and demodulate any of the 802.11ad modulation formats.

FIG. 3 also illustrates an 802.3 Ethernet frame and packet structure. Such a frame and packet structure may be compatible with the protocol (802.3) used by network tapping and packet brokering system 104. In the illustrated example, 802.3 Ethernet frame 302 includes a medium access control (MAC) destination address, a MAC source address and 46-1500 octets of payload. It can be seen from the difference between the 802.3 Ethernet frame 302 and the 802.11ad frame 300, that the frame formats are not compatible with each other. Accordingly, wireless network tap 102 may convert the 802.11ad frame format into a format compatible with the 802.3 protocol. One method for performing such a conversion is illustrated in FIG. 3, where the entire 802.11ad 300 is inserted into the payload portion of an 802.3 Ethernet frame 302. If the 802.11ad frame is more than 1500 octets, then the 802.ad frame may be fragmented and included in the payload portions of more than one 802.3 frames. Once the 802.11ad frame is placed in the 802.3 frame, the start of frame delimiter and preamble are added to the 802.3 frame to form a layer 1 Ethernet packet.

Figure 4:
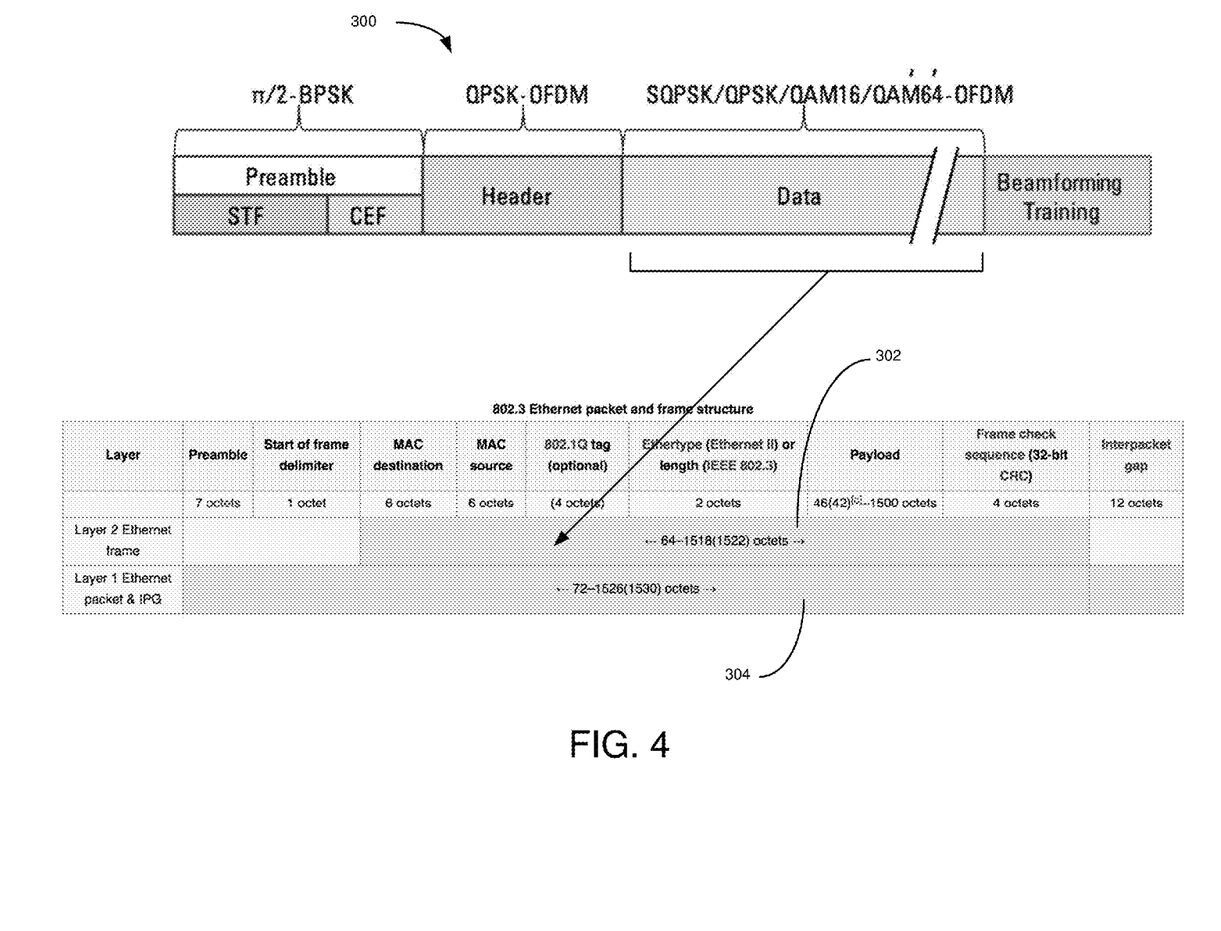
FIG. 4 is a diagram illustrating an alternate method for encapsulating an 802.11ad frame in an 802.3 Ethernet frame.

In an alternate implementation, rather than inserting the entire 802.11ad frame in the 802.3 Ethernet frame, wireless network tap 102 may extract values from selected fields from the 802.11ad frame and insert those values in the 802.3 frame. For example, referring to FIG. 4, if the only protocols of interest in a given test to a network monitoring application are application layer protocols, wireless network tap 102 may remove the frame body from the 802.11ad packet and insert only the data in the data field of the 802.11ad frame in the 802.3 frame, thereby replacing the layer 1 and 2 information from the 802.11ad frame the layer 1 and 2 information from the 802.3 frame. Wireless network tap 102 may also analyze data in the data field and selectively insert portions of the data in the 802.3 frame. In another example, wireless network tap 102 may insert data from more than one 802.11ad frame in a single 802.3 frame. In yet another example, wireless network tap 102 may compress the data from the 802.11ad frame before inserting the data in the 802.3 frame.

Returning to FIG. 2, in step 212, the packet is transmitted to network tapping and packet brokering system 104. For example, wireless network tap 102 may transmit the 802.3 frame to network tapping and packet brokering system 104 over a wired electrical or optical interface. Wireless network tap 102 may add inter-frame gaps between layer 1 802.3 packets before transmitting the packets to network tapping and packet brokering system 104. The wired electrical or optical interface used by wireless network tap 102 to communicate packets to network tapping and packet brokering system 104 may be any suitable interface over which network tapping and packet brokering system is capable of communicating. One example of an interface used by a network tapping and packet brokering system is a gigabit Ethernet interface. Because the packets are formatted according to the protocol expected by network tapping and packet brokering system 104, modifications to the existing network tapping and packet brokering system 104 are not required to monitor data transmitted over the wireless network. As a result, network visibility is extended in an efficient manner into the wireless network.

Returning to FIG. 2, in step 204, if the signal tapped from the wireless network is determined to be invalid according to the protocol being monitored, control proceeds to step 214 where an indication that the signal is invalid according to the wireless network protocol is generated. Step 214 may be implemented by wireless network tap 102. Control then proceeds to step 208 where a packet compatible with network tapping and packet brokering system 104 is generated. Control then proceeds to step 210 where the indication that the signal is invalid is inserted in the newly generated packet. In one example, the indication that the signal is invalid may be inserted in the payload of the packet. In another example, an unused header or trailer field may be used to carry the indication of invalid signal. In step 212, the newly generated packet with the indication of invalid signal is transmitted to network tapping and packet brokering system 104 over a wired interface, such as a wired optical or electrical interface.

Figure 5:
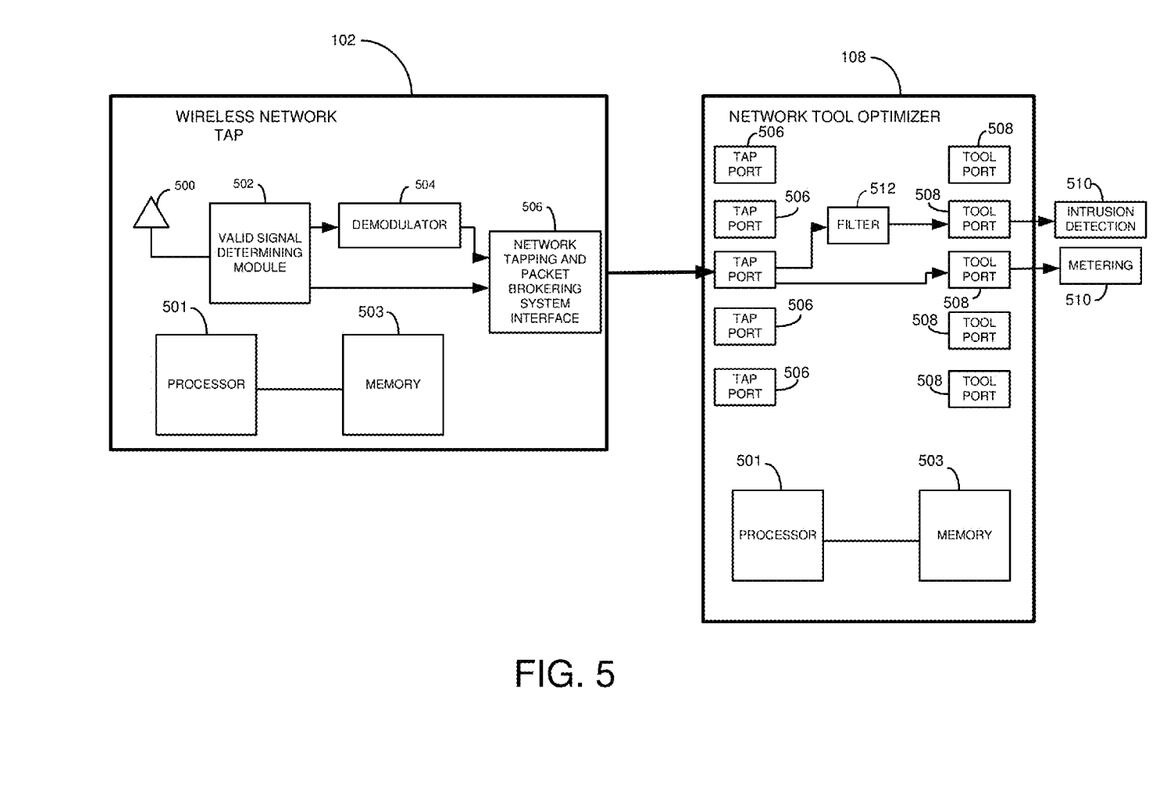
FIG. 5 is a diagram illustrating exemplary internal details of a wireless network tap and a network tool optimizer.

FIG. 5 is a block diagram illustrating wireless network tap 102 and network tool optimizer 108 in more detail. Referring to FIG. 5, wireless network tap 102 include a radio interface 500 for tapping signals in a wireless network. In one example, radio interface 500 may be an 802.11ad interface for tapping signals in an 802.11ad network. Wireless network tap 102 further includes a valid signal determining module 502 for determining whether a tapped signal is a valid signal according to the protocol being monitored. In one example, valid signal determining module 502 may decorrelate a received signal and compare the decorrelated signal to a valid or invalid signal signature to determine whether the signal includes valid 802.11ad content or is an attack or noise signal.

If valid signal determining module 502 determines that the signal is a valid signal according to the protocol being monitored, valid signal determining module 502 may transmit the signal to a demodulator 502 for demodulating the signal into a digital bit stream arranged according to the wireless network protocol. If the protocol being monitored is 802.11ad, demodulator 502 may implement spread spectrum demodulation, single carrier demodulation, or OFDM demodulation, as specified by the 802.11ad protocol to produce digital bit stream arranged according to the 802.11ad protocol. An example of such a bitstream is the 802.11ad packet illustrated in FIG. 3. Demodulator 502 may provide the demodulated bit stream to a network tapping and packet brokering system interface 506. Network tapping and packet brokering system interface 506 may generate a packet in a format compatible with network tapping and packet brokering system 104. In one example, the packet format may be an 802.3 Ethernet packet format. Network tapping and packet brokering system interface 506 may insert at least some of the bits from the demodulated bit stream into the 802.3 Ethernet packet and transmit the packet to network tool optimizer 108 over a wired Ethernet interface.

If valid signal determining module 502 determines that the signal is not a valid signal according to the protocol being monitored, valid signal determining module 502 may inform a network tapping and packet brokering interface module 504 that the signal is invalid. Network tapping and packet brokering system may generate a packet in the format compatible with network tapping and packet brokering system 104 and insert the indication that the signal is invalid according to the wireless network protocol in the payload portion of the packet. Wireless network tap 102 may then transmit the packet to network tool optimizer 108 over a wired network connection, such as a wired Ethernet connection.

Network tool optimizer 108 receives the 802.3 formatted Ethernet packets from wireless network tap 102. In the illustrated example, network tool optimizer 108 includes a plurality of tap ports 506 that receive tapped packets from various sources, including wireless network tap 102. Network tool optimizer 108 further includes a plurality of tool ports 508 that provide tapped packets to network monitoring tools 510. In the illustrated example, the network monitoring tools include an intrusion detection application and a metering application, for example, to meter network usage if the wireless network is providing metered services to another network. One or more filters 512 may be provided between some of the tap ports 506 and the tool ports 508 to filter copied packets to selectively direct only packets of interest to the associated network monitoring tool 510.

Both wireless network tap 102 and network tool optimizer 108 may include a processor 501 and a memory 503. Processor 501 and memory 503 of wireless network tap 102 may execute or implement any one or more of valid signal determining module 502, demodulator 504, and network tap and packet brokering system interface 506. Alternatively, any one or more of valid signal determining module, demodulator 504, and network tapping and packet brokering system interface 506 may be implemented in hardware or firmware. Processor 501 and memory 503 in network tool optimizer 108 may provide for configuration of a switching matrix to control forwarding of packets between tap ports 506 and tool ports 508. In addition, processor 501 and memory 503 of network took optimizer 108 may provide for configuration of filters 512.

By providing wireless network tap 102, the visibility of network monitoring tools 510 is extended into wireless networks, even wireless short range local area networks, such as wireless 802.11ad network. In one example, an attacker may seek to disrupt a wireless local area network by broadcasting noise in the frequency band used by the wireless local are network. In such a scenario, wireless network tap 102 detects an invalid signal, generates an indication that an invalid signal has been detected, formats and 802.3 Ethernet packet, inserts the indication in the packet, and transmits the packet to network tool optimizer 108 over a wired Ethernet connection. Network tool optimizer 108 receives the packet at one of its tap ports 506 and switches the packet to one of tool ports 508 and filter 512. Filter 512 may allow the packet to pass, as the packet may be marked to indicate that it carries information for intrusion detection application 510. The tool port 508 that received the packet may transmit the packet to intrusion detection application 510 over a wired or wireless link. Intrusion detection application 510 may receive the packet, read the indication of invalid signal, and generate a report or an alarm indicating the presence of an invalid signal in the wireless network.

In another example, wireless network tap 102 may tap a valid signal according to the protocol being monitored on the wireless network. Wireless network tap 102 may demodulate the signal into a sequence of bits formatted according to the protocol being monitored. Wireless network tap 102 may then encapsulate some or all of the bits demodulated from the wireless network in 802.3 Ethernet packets and transmit the packets to network tool optimizer 108 over a wired Ethernet link. Network tool optimizer 108 may receive, at one of tap ports 506, the 802.3 Ethernet packets encapsulating the data tapped from the wireless network and switch the packets to one or more of tool ports 508 with or without passing through filter 512. Whether or not the packets are filtered may depend on the type of network tool or application that ultimately receives the packets via tool ports 508. For example, if the network tool that receives the packets is a metering application, then it may be desirable to filter packets so that streams of packets to and from particular users are tracked. If the network tool that receives the packets is an intrusion detection application, then it may be desirable to pass the packets unfiltered to the tool port 508 so that all packets may be analyzed for potential attacks. The tool port that receives the packets may provide the packets to the application connected to the tool port via a wired or wireless network connection.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for network tapping and packet brokering in wireless networks, the method comprising:

using a wireless network tap to tap a signal transmitted between devices separate from the wireless network tap in a wireless network;

determining that the signal is a valid signal according to a wireless network protocol;

in response to determining that the signal is a valid signal according to the wireless network protocol, demodulating the signal into a sequence of bits arranged according to the wireless network protocol;

in response to determining that the signal is not a valid signal according to the wireless network protocol, generating an indication that the signal is not a valid signal according to the wireless network protocol;

generating a frame in a format compatible with a network tapping and packet brokering system;

inserting, in the frame, at least some of the bits, wherein inserting, in the frame, at least some of the bits includes inserting a payload of a wireless network protocol packet in an Ethernet frame; and transmitting the frame from a network tapping and packet brokering system interface of the wireless network tap to the network tapping and packet brokering system.

2. The method of claim 1 wherein determining that the signal is a valid signal according to the wireless network protocol includes decorrelating the signal and determining that the decorrelated signal matches a valid signature for the wireless network protocol instead of a noise signature.

3. The method of claim 1, wherein the wireless network protocol comprises a wireless local area network protocol and wherein demodulating the signal comprises demodulating the signal using demodulation specified by the wireless local area network protocol.

4. The method of claim 3 wherein the wireless local area network protocol comprises a short range wireless local area network protocol.

5. The method of claim 4 wherein the short range wireless local area network protocol comprises an 802.11ad protocol.

6. The method of claim 5 wherein inserting, in the frame, at least some of the bits includes inserting an entirety of the wireless network protocol packet in the Ethernet frame.

7. The method of claim 1 wherein transmitting the frame to the network tapping and packet brokering system comprises transmitting the frame from a wireless network tap to a network tool optimizer device over a wired Ethernet interface.

8. The method of claim 7 comprising, at the network tool optimizer device, brokering the frame to at least one network visibility application.

9. The method of claim 8 wherein brokering the frame to at least one network visibility application includes transmitting a copy of the frame to the at least one network visibility application.

10. A system for network tapping and packet brokering in wireless networks, the system comprising:

a wireless network tap for tapping a signal transmitted between devices separate from the wireless network tap in a wireless network, the wireless network tap including:

at least one processor;

a valid signal determining module implemented by the at least one processor for determining that the signal is a valid signal according to a wireless network protocol;

a demodulator for, responsive to a determination that the signal is a valid signal according to the wireless network protocol, demodulating the signal into a sequence of bits arranged according to the wireless network protocol; and a network tapping and packet brokering system interface for, in response to a determination that the signal is not a valid signal according to the wireless network protocol, generating an indication that the signal is not a valid signal according to the wireless network protocol;

generating a frame in a format compatible with a network tapping and packet brokering system, inserting, in the frame, at least some of the bits, wherein inserting, in the frame, at least some of the bits includes inserting a payload of a wireless network protocol packet in an Ethernet frame; and the network tapping and packet brokering system interface transmitting the frame to the network tapping and packet brokering system.

11. The system of claim 10 wherein the valid signal determining module decorrelates the signal and determines that the decorrelated signal matches a valid signal signature for the wireless network protocol.

12. The system of claim 10 wherein the demodulator demodulates the signal using demodulation specified by the wireless network protocol, and wherein the wireless network protocol comprises a wireless local area network protocol.

13. The system of claim 12 wherein the wireless network protocol comprises a short range wireless local area network protocol.

14. The system of claim 13 wherein the short range wireless local area network protocol comprises an 802.11ad protocol.

15. The system of claim 14 wherein the network tapping and packet brokering system interface inserts an entirety of the wireless network protocol packet in the Ethernet frame.

16. The system of claim 10 comprising a network tool optimizer, wherein the network tapping and packet brokering interface forwards the frame from the wireless network tap to the network tool optimizer.

17. The system of claim 16 wherein the network tool optimizer brokers the frame to at least one network visibility application.

18. The system of claim 17 wherein brokering the frame to at least one network visibility application includes transmitting a copy of the to the at least one network visibility application.

19. A non-transitory computer readable medium having stored thereon executable instructions that when executed by the processor of a computer control the computer to perform steps comprising:

using a wireless network tap to tap a signal transmitted between devices separate from the wireless network tap in a wireless network;

determining that the signal is a valid signal according to a wireless network protocol;

in response to determining that the signal is a valid signal according to the wireless network protocol, demodulating the signal into a sequence of bits arranged according to the wireless network protocol;

in response to determining that the signal is not a valid signal according to the wireless network protocol, generating an indication that the signal is not a valid signal according to the wireless network protocol;

generating a frame in a format compatible with a network tapping and packet brokering system;

inserting, in the frame, at least some of the bits wherein inserting, in the frame, at least some of the bits includes inserting a payload of a wireless network protocol packet in an Ethernet frame; and transmitting the frame from a network tapping and packet brokering system interface of the wireless network tap to the network tapping and packet brokering system.

* * * * *

UNITED STATES PATENT AND TRADEMARK OFFICE
CERTIFICATE OF CORRECTION

PATENT NO. : 10,313,493 B2
APPLICATION NO. : 15/383299
DATED : June 4, 2019
INVENTOR(S) : Stephen Samuel Jackson Page 1 of 1

It is certified that error appears in the above-identified patent and that said Letters Patent is hereby corrected as shown below:

In the Claims

In Column 8, Line 25, in Claim 3, delete "claim 1," and insert -- claim 1 --, therefor.

Signed and Sealed this
Sixth Day of August, 2019

Andrei Iancu
*Director of the United States Patent and Trademark Office*